June 11, 1968     R. A. KJAR     3,388,266
PULSE PROCESSOR

Filed June 11, 1965     2 Sheets-Sheet 1

INVENTOR
RAYMOND A. KJAR

BY    AGENT
       ATTORNEY

INVENTOR
RAYMOND A. KJAR

3,388,266
PULSE PROCESSOR
Raymond A. Kjar, Alexandria, Va., assignor to the United
States of America as represented by the Secretary of the Navy
Filed June 11, 1965, Ser. No. 463,408
13 Claims. (Cl. 307—231)

ABSTRACT OF THE DISCLOSURE

A pulse processor having a self-adjusting acceptance barrier which includes a storage means for storing a signal of a level determined by the input pulse to the processor provided that the input pulse exceeds the storage level. Pulses having an amplitude greater than the barrier will be accepted at any time while pulses having an amplitude less than the barrier will not be accepted. The reception of a signal of amplitude exceeding the barrier creates the condition for generating a pulse output from the processor.

---

Figure 1:
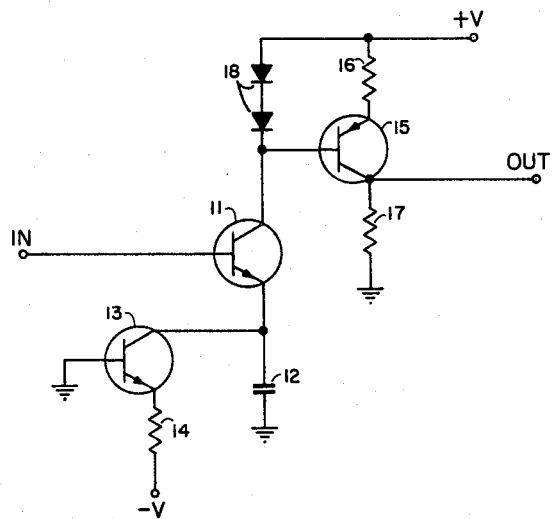

The invention described herein may be manufactured and used by or for the Government of the United States of America for governmental purposes without the payment of any royalties thereon or therefor.

The present invention relates to a pulse processor which in particular is a self-adjusting acceptance barrier pulse processor.

Often in the processing of received signals the desired signals must be separated and distinguished from unwanted signals such as reflections and noise. A reflection or reflected signal is of lesser amplitude than and appears shortly after the direct signal. Because of the only somewhat lesser amplitude of this undesired signal and because of the time proximity to its direct counterpart, its presence is often deleterious to accurate communication. Also, since as a general proposition, signals transmitted from other stations most often do not appear in the close time sequence to prior signals received as do reflected signals, the reflected signals may generally be deleted without harm to desirable signals.

Many processing circuits of the prior art have been devoted to the elimination of unwanted signals. These circuits have not, however, been suitable to the reception of signals which have first been logarithmically processed. Thus, when the input to the processor is the logarithm of the signal received, the processor must eliminate signal reflections and produce an output pulse having a pulse width equal to the width of the antilogarithm of the input pulse to the processor.

It is accordingly an object of the present invention to process signals received to eliminate unwanted signals.

Another object is to eliminate reflected signals without interfering with the reception of direct signals.

A further object is to provide a barrier creating processor to inhibit further acceptance of signals of lesser amplitude than the initial signal received which follow in close time sequence to said initial signal.

It is another object of the present invention to provide pulses of width commensurate with the width of pulses which have been logarithmically processed.

A further object of the present invention is to provide a self-adjusting pulse acceptance barrier processor capable of generating pulses of width equal to the width of the antilogarithms of the input pulses to the processor, while processing those pulses received to eliminate reflected pulses.

To accomplish the objects set forth, the processor of the present invention incorporates storage means for storing a signal of a level determined by the input pulse to the processor provided that the input pulse exceeds the storage level. The signal stored is thus a barrier to those signals which do not exceed the storage level. Since the stored signal is continuously discharged, an input signal arriving at the processor after a time period commensurate with the discharge time will be accepted. In addition, pulses of amplitude greater than the barrier will be accepted at any time. The reception of a signal of amplitude exceeding the barrier creates the condition for generating a pulse output from said processor. This output pulse truly represents the width of the antilogarithm of the pulse received by the processor because only that portion of the pulse which exceeds the barrier, the top of the input, which is undistorted by the logrithmic processing, determines the width of the pulse out.

Figure 2:
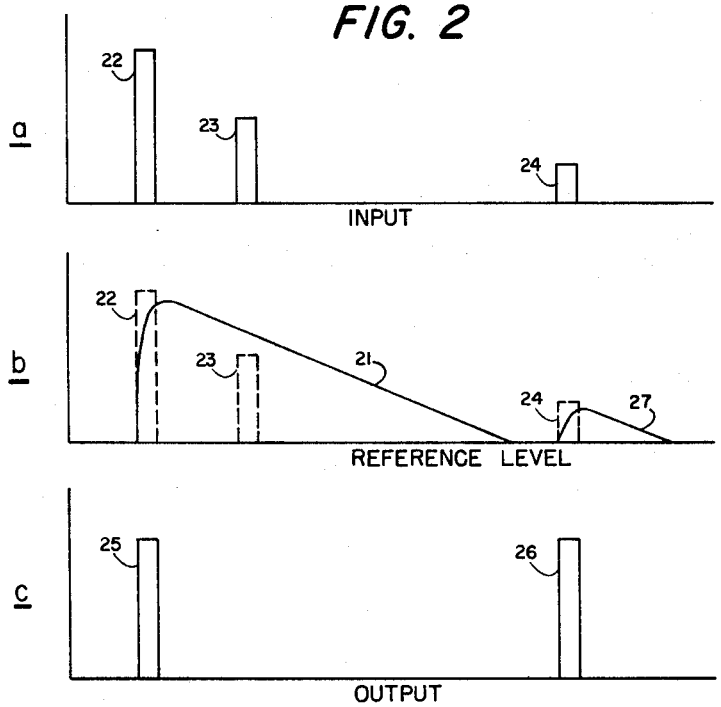
Figure 3:
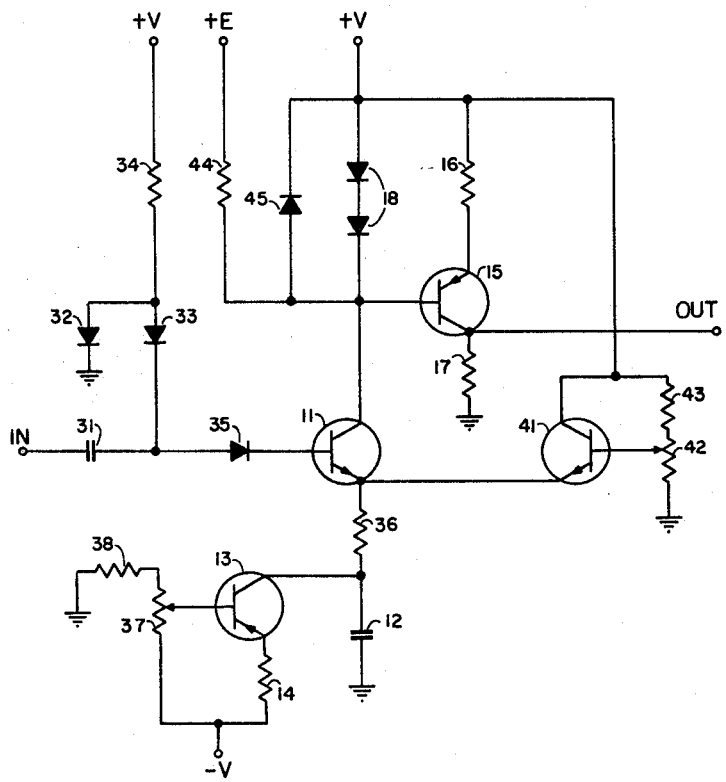

Other advantages of the invention will become more fully apparent and better understood from the following description of an embodiment of the invention selected by way of example, as illustrated in the drawings, in which:

FIG. 1 shows a basic pulse processor;
FIG. 2 illustrates the pulse relationships established by the pulse processor; and
FIG. 3 shows a more sophisticated version of the processor.

Referring now to the figures, wherein like characters refer to like parts throughout, there is shown in FIG. 2 three pulse-time diagrams, a, b and c. Each diagram represents amplitude on the ordinate axis and time along the abscissa. Input pulses 22, 23 and 24 are shown in solid lines in diagram a and appear in dashed lines in diagram b. Pulse 22 represents a signal received from a nearby station, pulse 23 being the reflection of this pulse, and pulse 24 is a later received pulse from a distant station. When a signal is received by the processor and it is desired that the reflection of that signal be blocked without inhibiting further reception of direct signals, a barrier may be created which is caused to deteriorate before direct signals are affected but of sufficient duration to impede reflected signals. If the barrier is initially substantially the same height as the received pulse the reflected pulse, being of slightly less amplitude than its direct counterpart and appearing but a short time later, will be inhibited by the barrier. Such a barrier to the acceptance of signals is shown in diagram b of FIG. 2. Here, acceptance barrier or reference level 21 is shown generated by pulse 22, inhibiting pulse 23 and not affecting pulse 24. Diagram b also shows direct pulse 24 generating a barrier 27. While the barriers shown decay linearly, this is not a limitation on the operation of the pulse processor, but merely serves to illustrate the barrier concept.

Diagram c of FIG. 2 shows output pulses 25 and 26 which are of a predetermined fixed amplitude unrelated to the amplitude of the corresponding input signal, but of a width determined by these latter signals.

FIG. 1 shows an illustrative embodiment of a self-adusting barrier pulse processor including a capacitor 12 capable of storing a signal indicative of the amplitude of the signal appearing at the input to the processor. The input of the processor is shown at the base of transistor 11 and labeled "IN." Transistor 11, coupling the input of the circuit to the storage means 12 serves as sensor, unidirectional conductor and comparer. This transistor at all times senses and compares the input signal with the capacitor's storage level and conducts to charge the capacitor whenever the voltage on the base exceeds the voltage at the emitter, i.e., the storage level. A transistor 13 is also connected to the capacitor. Transistor 13 provides a constant current discharge path for capacitor 12, the rate of discharge being regulated by emitter resistor 14 and the bias supply, indicated —V. The collector of transistor 13 is connected to the capacitor and the base is connected to ground to insure that capacitor 12 will discharge to ground level. This transistor is thus conducting so long as the potential on the collector is above ground. To insure a constant current discharge and a discharge at a rate low compared to the charge time of capacitor 12, resistor 14 is selected to be large in value.

The three elements described above, i.e. transistors 11 and 13 and capacitor 12, constitute the barrier generating portion on the circuit. The remaining elements of the circuit form the pulse output generator. Diodes 18 connect positive supply +V to the collector of transistor 11 and in addition are connected across the emitter-base junction of output transistor 15. Thus, when transistor 11 is conducting, the voltage drop across diodes 18 serves to forward bias the output transistor into conduction. Transistor 15 will remain conducting so long as the bias is maintained. The output of this transistor appears at the collector and is the output of the processor, being labeled OUT in the figure. The pulse out is realized across collector resistor 17, the amplitude of the pulse being determined by resistors 16 and 17 and the diodes 18. Resistor 16, the emitter resistor of transistor 15, serves to limit the emitter current.

The width of the pulse out of the processor is determined by the period of conduction of transistor 11. Thus the output pulse width is commensurate with the input pulse width. In reality the output pulse is determined by the width of the input pulse at the top of this pulse since conduction of transistor 11 continues only so long as the charge on capacitor 12 is less than the amplitude of the input pulse. Reference may be had to FIG. 2b where it is shown that the input pulses which generate the acceptance barrier exceed the charge level by only a small amount such that when the input pulse falls to the charge level the conduction of transistor 11 and thus the output pulse is terminated.

FIG. 3 shows a more sophisticated version of the pulse processor of the present invention. One of the most significant additions to the basic circuit of FIG. 1 is emitter resistor 36 which serves to couple the emitter of transistor 11 to capacitor 12. This resistor solves the problem of providing a pulse of width equal to the width of the antilogarithm of the pulse input to the processor. In practice, an input pulse may not be the clean cut square pulse shown in FIG. 2, but is often subject to slight variations in amplitude across the width of this pulse. Because it is essential that the width of the input pulse control the width of the output pulse, these false indications of input pulse termination must be overcome. Resistor 36 has been inserted in the circuit to provide a voltage drop sufficient to obviate the adverse effect of these aberrations in the pulses received. The input pulse must now drop to a capacitor charge level lowered by the drop across resistor 36 before transistor 11 cuts off. Transistor 13 provides a current path for the continued conduction of transistor 11 after capacitor 12 has reached its charge capacity. When a pulse has been logrithmically amplified the rise and fall and thus the width of the pulse has been changed at all points except at the peak. Since transistor 11 conducts only when the input pulse exceeds the charge level of the capacitor, only the top portion of the input pulse is used for determining the width of the output pulse and the pulse width of the antilogarithm of the input pulse has been preserved.

At the input or base lead of transistor 11 there is now shown a capacitor 31 which serves as a coupling capacitor from the preceeding logrithmic processing circuit, for example. Connected to the base lead is also a pair of diodes 32 and 33 and a resistor 34 coupled to the positive voltage supply +V. Diode 32, connected to ground, serves to establish the threshold or conduction potential of diode 33, and diode 33 clamps the processor input at ground potential. Resistor 34 serves merely to maintain the current through diode 32. Diode 35 couples the capacitor 31 and the afore-mentioned diode network to the base of transistor 11 and also serves as an additional voltage dropping device to insure cutoff of this transistor in the absence of a pulse received. Resistors 37 and 38 have been added to the discharge circuit of transistor 13 to provide control for the slope of the discharge path.

The circuit of FIG. 3 also shows an addition made to the reference signal or acceptance barrier maintaining circuit which includes transistor 41, variable resistor 42 and resistor 43. This circuit serves to clamp the discharged capacitor 12 to a preselected potential, which result is obtained when the capacitor has sufficiently discharged to place the potential at the emitter of transistor 41 at a lower potential than the base of that transistor. The emitter-base diode of his transistor is then forward biased and the ungrounded plate of capacitor 12 is clamped to the potential of the base of transistor 41 via resistor 36. With the base of this transistor connected to variable resistor 42, the minimum discharge limit of the capacitor is controllable and the limit may be retained at a voltage above the noise level thereby maintaining a noise barrier for the processor.

With the voltage discharge level of capacitor 12 being controlled by transistor 41 and not transistor 13, as in the FIG. 1 embodiment, the base of transistor 13 is biased negative to keep this transistor from saturating.

The bias or control circuit of the output pulse generator has also been modified. Resistor 44 and positive supply +E, greater than +V, have been added to provide additional base current for transistor 15, insuring fast turn-off of this pulse generator. It will be noted that diodes 18 serve to clamp the base of transistor 15 to a voltage which is +V less the drop across these diodes and thus when the clamp is removed upon the stopping of conduction of transistor 11, the supply potential of +E is virtually connected to the base of transistor 15 thereby assuring its cutoff. Diode 45 has been added in parallel with diodes 18 to prevent the base of transistor 15 from going more positive than +V when the transistor is turned off.

The basic principles of the present invention have been heretofore described in terms of the embodiment shown in the drawings. It should be understood that the circuit in the drawings is for the purpose of illustration and that the basic concepts of self-adjusting acceptance barrier generation with pulse width preservation maintained through even the antilogarithm of the input pulse remains the essence of the invention. In achieving this, the particular storage means used is not limited to a capacitor nor are the active elements confined to semiconductors. Indeed, the concept of the self-adjusting acceptance barrier is not limited to a linear decay or sawtooth function as it is within the purview of the present invention to regulate the decay of the storage device in a manner suitable to the application at hand.

Since various changes and modifications maybe made in the practice of the invention herein described without departing from the spirit or scope thereof, it is intended that the foregoing description shall be taken primarily by way of illustration and not in limitation except as may be required by the appended claims.

What is claimed and desired to be secured by Letters Patent of the United States is:

1. A self-adjusting acceptance barrier processor, comprising:
   storage means accepting and storing signals applied thereto of greater amplitude than the storage level of said storage means;
   discharge means coupled to said storage means for discharging same;
   control means coupled to said storage means and to the input of said processor for sensing the signal storage level and the amplitude of the input signal to said processor,
   said control means applying a signal to said storage means so long as the amplitude of the input signal exceeds said storage level; and
   pulse generating means responsive to said control means for providing a signal output for said processor so long as said control means is applying a signal to said storage means.

2. A self-adjusting acceptance barrier processor as recited in claim 1, further including bias means the bias potential of which is generated by the conduction of said control means when applying a signal to said storage means, said bias means coupled to and controlling the operation of said pulse generating means.

3. A self-adjusting acceptance barrier processor as recited in claim 2, wherein said storage means is a capacitor.

4. A self-adjusting acceptance barrier processor, comprising:
reference signal maintaining means;
sensing means coupled to sense the level of the signal input to said processor and the level of said reference signal,
said sensing means applying a signal to said reference signal maintaining means when the amplitude of said input signal exceeds the level of said reference to raise the level of said reference signal to that of said input signal;
discharge means coupled to said reference signal maintaining means to dissipate said reference signal at a rate low compared to the rate of signal application to said reference signal maintaining means; and
a pulse generator coupled to said sensing means to produce a pulse of duration determined by the period which said input signal exceeds said reference signal.

5. A self-adjusting processor, comprising:
signal storage means;
comparer means coupled to said storage means and to the input to said processor to compare the level of the input signal with the stored signal level,
said comparer means conducting to charge said storage means when said input signal exceeds said stored signal;
discharge means coupled to said signal storage means to maintain a constantly decreasing current discharge of said signal storage means;
bias means coupled to said comparer means, said bias means caused to develop a bias potential during the conduction of said comparer means; and
pulse generating means coupled to said bias means to produce a pulse signal whenever said bias means develops a bias potential, the width of the pulse generated being determined by the duration of said bias potential.

6. A self-adjusting processor as recited in claim 5, further including impedance means coupling said comparer means to said signal storage means, said impedance means developing a voltage thereacross upon the conduction of said comparer means thereby limiting the maximum charge level of said storage means such that the conduction of said comparer means will continue until said input signal falls to said maximum charge level.

7. A self-adjusting processor as recited in claim 7, further including discharge limit means coupled to said signal storage means to control the signal level of said storage means when a state of discharge, said discharge limit means being capable of creating a barrier to the reception of noise by said processor when the discharge signal level of said signal storage means is set above the noise level.

8. A self-adjusting processor, comprising:
a capacitor capable of maintaining a charge commensurate with the input pulse level to said processor;
unidirectional conducting means coupled to said capacitor and to the input of said processor, said unidirectional conducting means conducting to charge said capacitor whenever the input pulse level exceeds the charge level;
impedance means coupling said unidirectional conducting means to said capacitor, said impedance means developing a voltage drop thereacross when said conducting means is conducting;
discharge means connected to said capacitor and said impedance means to discharge said capacitor at a constant rate for a period long compared to the charging time and for maintaining said unidirectional conducting means in a state of conduction until said input pulse level falls to the charge level of said capacitor; and
pulse generating means coupled to said unidirectional conducting means to produce a pulse output from said processor whenever said unidirectional conducting means is conducting, the width of the output pulses being commensurate with the period of conduction of said unidirectional conducting means.

9. The processor of claim 1 wherein pulse generating means includes a transistor having its base coupled to said control means.

10. The processor of claim 1 wherein said discharge means includes a transistor having its collector coupled between said storage means and said control means.

11. The processor of claim 1 wherein said control means include a transistor.

12. The processor of claim 11 wherein said pulse generating means is coupled to the collector of said transistor control means.

13. The processor of claim 7 wherein said discharge limit means includes:
a transistor, the emitter of which is coupled to said signal storage means.

References Cited

UNITED STATES PATENTS

| | | | |
|---|---|---|---|
| 3,053,996 | 9/1962 | Stefanov | 307—88.5 |
| 3,109,107 | 8/1963 | Lee | 307—88.5 |
| 3,305,787 | 2/1967 | Distler et al. | 328—51 |

ARTHUR GAUSS, *Primary Examiner.*

B. P. DAVIS, *Assistant Examiner.*